(12) United States Patent
Une

(10) Patent No.: US 7,505,175 B2
(45) Date of Patent: Mar. 17, 2009

(54) IMAGE FORMATION FROM RASTER DATA SELECTIVELY PROCESSED BASED ON PDL FILL OR DRAW COMMANDS

(75) Inventor: Kiyoshi Une, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 988 days.

(21) Appl. No.: 10/936,623

(22) Filed: Sep. 9, 2004

(65) Prior Publication Data
US 2005/0206922 A1 Sep. 22, 2005

(30) Foreign Application Priority Data
Mar. 18, 2004 (JP) ............................. 2004-078652

(51) Int. Cl.
H04N 1/40 (2006.01)
H04N 1/50 (2006.01)
(52) U.S. Cl. ...................... 358/2.1; 358/3.24; 358/462
(58) Field of Classification Search ................. 358/1.9, 358/2.1, 2.99, 3.01, 3.06, 3.2, 3.24, 1.13, 358/518, 534, 536, 462, 470; 382/100, 173, 382/176, 180; 715/204, 276; 345/581, 589, 345/596, 600, 604
See application file for complete search history.

(56) References Cited

U.S. PATENT DOCUMENTS

| 5,291,296 | A | * | 3/1994 | Hains | 358/3.07 |
|---|---|---|---|---|---|
| 6,100,996 | A | * | 8/2000 | Amano et al. | 358/1.9 |
| 6,226,011 | B1 | * | 5/2001 | Sakuyama et al. | 345/600 |
| 6,870,637 | B1 | * | 3/2005 | Watanabe | 358/1.9 |
| 7,031,019 | B1 | * | 4/2006 | Sakurai | 358/1.9 |
| 2007/0002348 | A1 | * | 1/2007 | Hagiwara | 358/1.13 |
| 2007/0236739 | A1 | * | 10/2007 | Murakami et al. | 358/3.06 |
| 2008/0025557 | A1 | * | 1/2008 | Fujiwara et al. | 382/100 |

FOREIGN PATENT DOCUMENTS

| JP | 09193477 A * | 7/1997 |
|---|---|---|
| JP | A 2001-45299 | 2/2001 |
| JP | A 2003-168124 | 6/2003 |

* cited by examiner

Primary Examiner—Scott A Rogers
(74) Attorney, Agent, or Firm—Oliff & Berridge, PLC

(57) ABSTRACT

An image forming method for creating raster data based on image data written in a page description language, and forming an image based on the created raster data, in which different image processing is implemented respectively on first raster data created on the basis of a pattern fill command written in the page description language, and second raster data created on the basis of a command other than the pattern fill command.

30 Claims, 15 Drawing Sheets

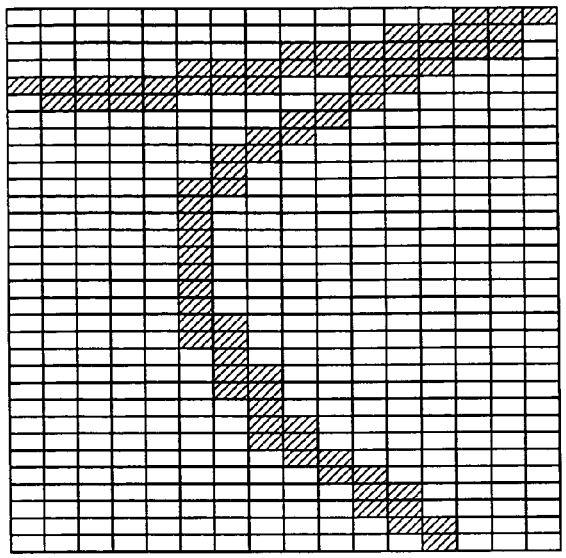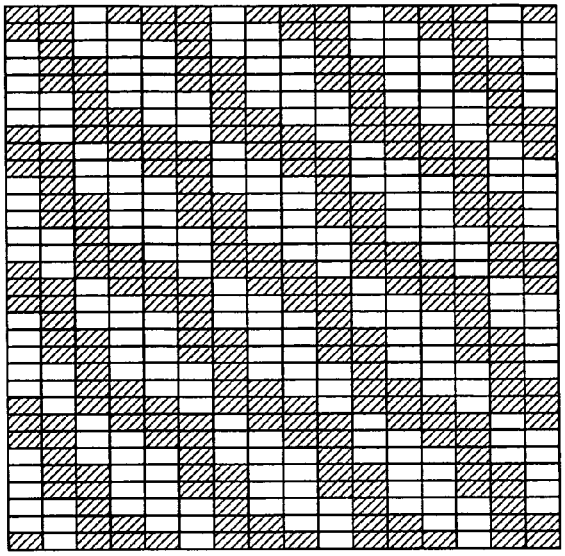
FIG. 8A    FIG. 8B
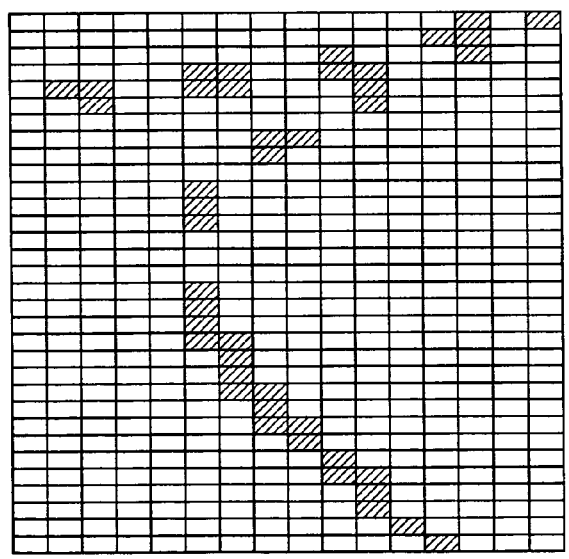
FIG. 8C

IMAGE FORMATION FROM RASTER DATA SELECTIVELY PROCESSED BASED ON PDL FILL OR DRAW COMMANDS

BACKGROUND OF THE INVENTION

1. Field of the Invention

The present invention relates to an image forming method and apparatus, and more particularly to an image forming method and apparatus for creating raster data on the basis of image data written in a page description language, and forming an image on the basis of the created raster data.

2. Description of the Related Art

Typically, documents and so on created on a PC (personal computer) or the like are transmitted to an image forming apparatus such as a printer in a page description language. Raster data based on the page description language are then created in the image forming apparatus, whereupon image processing such as screen processing or the like is implemented on the created raster data. The document is then printed onto paper or the like and output.

With recent application software, it has become possible to apply pattern fill processing such as halftone dot meshing or translucence to created documents. In certain cases, however, the parts to which such pattern fill processing has been applied, as well as small characters, thin lines, and so on disappear due to interference with the screen used in the screen processing in the image forming apparatus.

For example, when 25% halftone dot meshing processing is implemented on a filled region such as that shown in FIG. 13A, raster data such as those shown in FIG. 13B are created. When screen processing using a 50% screen, such as that shown in FIG. 13C, is applied thereto, the processing result is as shown in FIG. 13D, where the halftone dot meshing pattern has altered greatly. Note that in FIGS. 13A to 13D, the diagonally shaded parts are rendered parts, and the pattern in FIG. 13D, which shows the result of the screen processing, is the product of the patterns shown in FIGS. 13B and 13C (AND processing).

When screen processing using a 50% screen such as that shown in FIG. 14B is implemented on a thin line such as that shown in FIG. 14A, the processing result is as shown in FIG. 14C, where the original thin line has become a dotted line with wide intervals. Note that in FIGS. 14A to 14C, the diagonally shaded parts are rendered parts, and the pattern shown in FIG. 14C, which shows the result of the screen processing, is the product of the patterns shown in FIGS. 14A and 14B (AND processing).

Likewise, when screen processing using a 50% screen such as that shown in FIG. 15B is implemented on a character such as that shown in FIG. 15A, the processing result is as shown in FIG. 15C, where many parts of the original character have been deleted. Note that in FIGS. 15A to 15C, the diagonally shaded parts are rendered parts, and the pattern shown in FIG. 15C, which shows the result of the screen processing, is the product of the patterns shown in FIGS. 15A and 15B (AND processing).

Examples of techniques for preventing deterioration of the image quality caused by such interference with the screen include amending the phenomenon whereby a pattern disappears by adding processing such as pattern modification when a pattern produced by a pattern fill command seems likely to disappear due to interference with the screen or the like (for example, Japanese Patent Application Laid-Open No. 2003-168124), performing processing when an isolated dot is detected to emphasize the dot and its periphery (for example, Japanese Patent Application Laid-Open No. 2001-45299), and so on.

However, in both the technique described in Japanese Patent Application Laid-Open No. 2003-168124 and the technique described in Japanese Patent Application Laid-Open No. 2001-45299, patterns are made more distinguishable by adding modifications to the original pattern, and hence time is required to detect the pattern and apply modification processing thereto.

Moreover, although the processing time can be shortened by implementing these processes using hardware, large costs are involved in constructing the hardware.

SUMMARY OF THE INVENTION

It is therefore an object of the present invention to provide an image forming method and apparatus which, without adding modifications to a pattern, are able to suppress cost increases caused by lengthened processing time, and prevent deterioration of the image quality caused by interference with a screen or the like.

To achieve the object described above, an aspect of the invention is an image forming method for creating raster data based on image data written in a page description language, and forming an image based on the created raster data, wherein different image processing is implemented on first raster data created on the basis of a pattern fill command written in the page description language, and second raster data created on the basis of a command other than the pattern fill command.

According to the present invention, raster data created on the basis of a pattern fill command, a line drawing command, and a small character drawing command respectively are identified on the basis of the page description language, and different image processing is implemented on these identified raster data to the image processing that is implemented on the other raster data. As a result, deterioration of the image quality caused by interference with the screen or the like can be prevented using simple processing, without requiring a large amount of processing time and large costs.

BRIEF DESCRIPTION OF THE DRAWINGS

Embodiments of the present invention will be described in detail based on the following figures, wherein:

FIGS. 8A to 8C are views illustrating the effects of the case in which the screen processing of the second embodiment is implemented on a character part;

DETAILED DESCRIPTION OF THE INVENTION

Embodiments of the image processing method and apparatus according to the present invention will be described in detail below with reference to the attached figures.

First Embodiment

Figure 1:
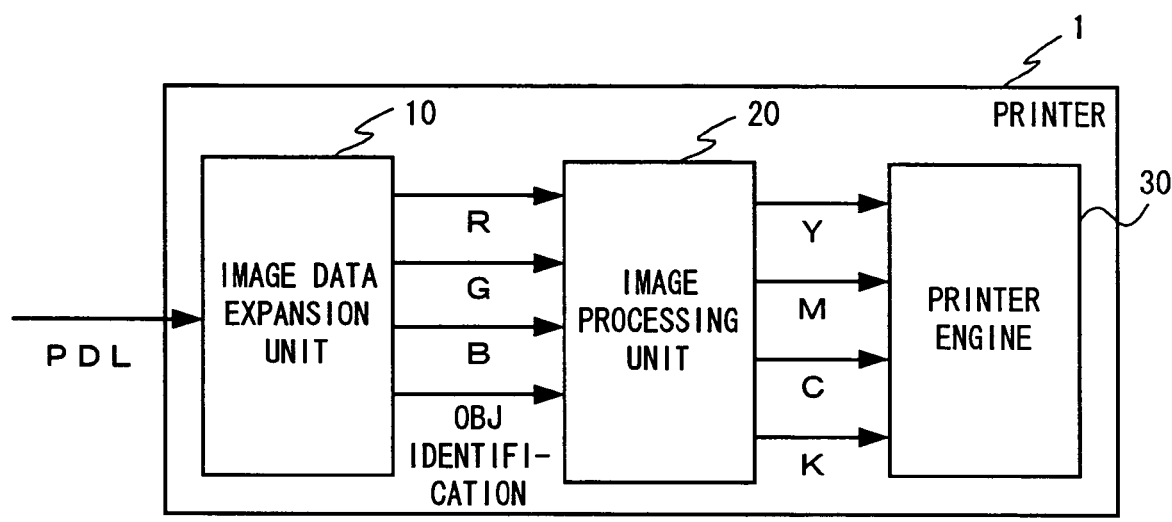
FIG. 1 is a block diagram showing the functional constitution of a printer to which the present invention is applied.

FIG. 1 is a block diagram showing the functional constitution of a printer to which the present invention is applied. As shown in the figure, a printer 1 comprises an image data expansion unit 10, an image processing unit 20, and a printer engine 30.

The image data expansion unit 10 interprets a page description language (PDL) input from a PC or the like, not shown in the figure, and creates raster data based on the results of the interpretation. The created raster data comprise data denoted by each of three colors, R (red), G (green), and B (blue), and in addition, an object tag is attached to each object in the raster data so that T/I separation (text/image separation) processing can be performed in the image processing unit 20. The object tags also comprise a "Pattern" tag indicating pattern fill parts, thin line parts, and small character parts which may deteriorate in image quality due to interference or the like during screen processing.

The image processing unit 20 implements image processing such as color conversion processing and screen processing on the raster data input from the image data expansion unit 10, and outputs data denoted by each of four colors, Y (yellow), M (magenta), C (cyan), and K (black) to the printer engine 30. In the image processing unit 20, raster data attached with the "Pattern" tag are subjected to different image processing to the other data.

The printer engine 30 forms an image on paper or the like on the basis of the data denoted by each of the colors Y, M, C, K input from the image processing unit 20.

Figure 2:
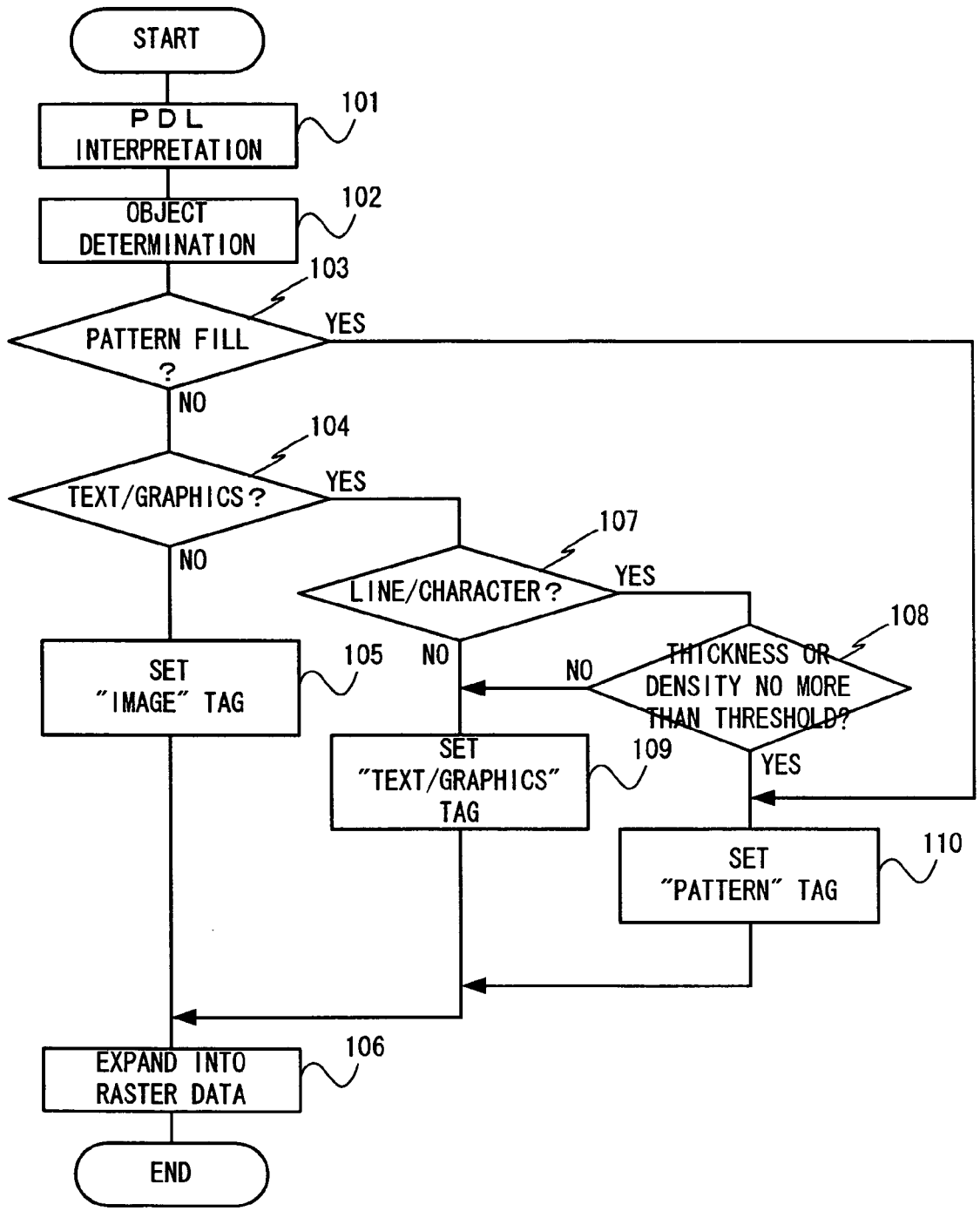
FIG. 2 is a flowchart showing the flow of processing in an image data expansion unit 10.

The processing implemented in the image data expansion unit 10 will now be described. FIG. 2 is a flowchart showing the flow of processing in the image data expansion unit 10.

First, in the image data expansion unit 10, the input PDL is interpreted (step 101), and then the objects are determined (step 102).

If, as a result of the determination, an object is deemed to be an image (NO in step 103, NO in step 104), an "Image" tag is set (step 105), and the object is expanded into raster data (step 106).

If an object is text or a graphic (NO in step 103, YES in step 104) but not a line or character (NO in step 107), or a line or character having a thickness or density value that is greater than a prescribed threshold (YES in step 107, NO in step 108), then a "Text/Graphics" tag is set (step 109), and the object is expanded into raster data (step 106).

If an object is a line or character having a thickness value that is equal to or less than the prescribed threshold and a density value that is equal to or less than the prescribed threshold (NO in step 103, YES in step 104, YES in step 107, YES in step 108), or if the object is a pattern fill (YES in step 103), then the "Pattern" tag is set (step 110), and the object is expanded into raster data (step 106).

Note that the "Image" tag and "Text/Graphics" tag are similar to those used conventionally.

Figure 3:
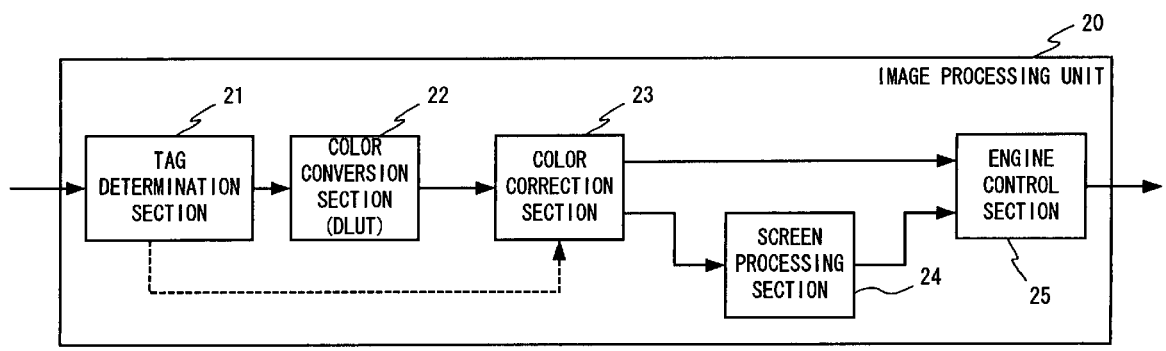
FIG. 3 is a block diagram showing the functional constitution of an image processing unit 20.

Next, the processing implemented in the image processing unit 20 will be described. FIG. 3 is a block diagram showing the functional constitution of the image processing unit 20.

As shown in the figure, the image processing unit 20 comprises a tag determination section 21, a color conversion section 22, a color correction section 23, a screen processing section 24, and an engine control section 25.

The tag determination section 21 identifies the "Image" tags, "Text/Graphics" tags, and "Pattern" tags set in the raster data input from the image data expansion unit 10, and ensures that the processing performed by the screen processing section 24 is not implemented on the raster data set with a "Pattern" tag.

The color conversion section 22 converts the data denoted by each of the R, G, B colors into data denoted by each of the Y, M, C, K colors using a DLUT (direct lookup table). The color correction section 23 performs color correction processing and the like using a TRC (tone reproduction curve). The screen processing section 24 performs screen processing. The engine control section 25 outputs the raster data denoted by each of the Y, M, C, K colors to the printer engine 30, and outputs signals for controlling the printer engine 30.

In the image processing unit 20, the raster data determined in the tag determination section 21 to be set with the "Image" tag or "Text/Graphics" tag are subjected to processing that is similar to conventional processing in the color conversion section 22, color correction section 23, screen processing section 24, and engine control section 25 successively, whereas the raster data determined in the tag determination section 21 to be set with the "Pattern" tag are subjected to processing in the color conversion section 22, color correction section 23, and engine control section 25 successively.

Hence the raster data set with the "Pattern" tag are not subjected to screen processing, and are output to the printer engine without implementing dithering processing, thereby remaining at the resolution of the printer engine 30. Since interference between the raster data set with the "Pattern" tag and the screen does not occur, deterioration of the image quality can be reduced.

Second Embodiment

Of the processing to be described in the second embodiment, only the processing performed in the image processing unit 20 differs from the processing of the first embodiment, and hence only the processing performed by an image processing unit 20' corresponding to the image processing unit 20 will be described.

Figure 4:
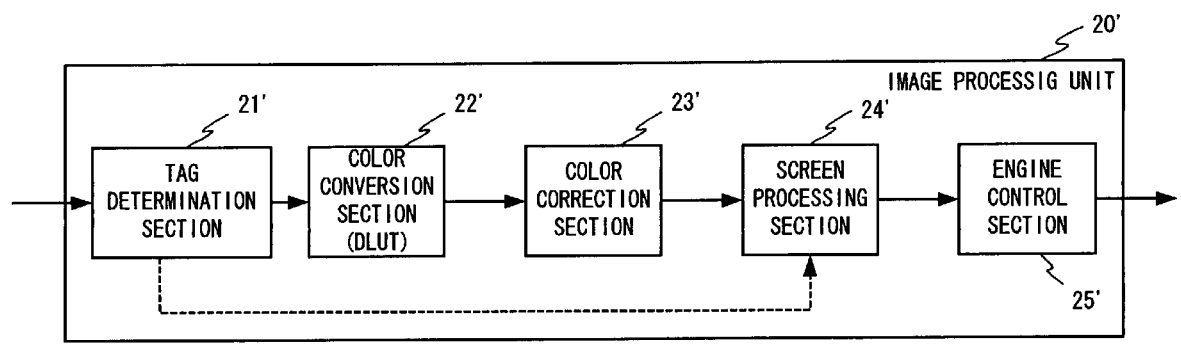
FIG. 4 is a block diagram showing the functional constitution of an image processing unit 20'.

FIG. 4 is a block diagram showing the functional constitution of the image processing unit 20'. As shown in the figure, the image processing unit 20' comprises a tag determination section 21', a color conversion section 22', a color correction section 23', a screen processing section 24', and an engine control section 25'.

The tag determination section 21' identifies the "Image" tags, "Text/Graphics" tags, and "Pattern" tags set in the raster data input from the image data expansion unit 10, and switches the screen used in the processing performed by the screen processing section 24' for the raster data set with the "Pattern" tag.

The color conversion section 22' converts the data denoted by each of the R, G, B colors into data denoted by each of the Y, M, C, K colors using a DLUT. The color correction section 23' performs color correction processing and the like using a TRC. The screen processing section 24' performs screen processing. The engine control section 25' outputs the raster data denoted by each of the Y, M, C, K colors to the printer engine 30, and outputs signals for controlling the printer engine 30.

In the image processing unit 20, all of the raster data are subjected to successive processing in the color conversion section 22', color correction section 23', screen processing section 24', and engine control section 25'. However, the screen that is used by the screen processing section 24' differs for the raster data determined by the tag determination section 21' to be set with the "Image" tag or "Text/Graphics" tag, and the raster data determined by the tag determination section 21' to be set with the "Pattern" tag.

Note that the screen processing implemented on the raster data determined to be set with the "Image" tag or "Text/Graphics" tag is similar to conventional processing, and hence description thereof has been omitted.

A screen having a higher screen ruling than a conventional screen, or a 45 degree screen pattern, is used for the raster data that have been determined to be set with the "Pattern" tag. Note, however, that for thin lines, a screen pattern matching the angle of the lines may be used. The reason for selecting a 45 degree screen pattern is that patterns such as halftone dot meshing often have a 45 degree period, and hence interference is unlikely to occur.

Figure 5A:
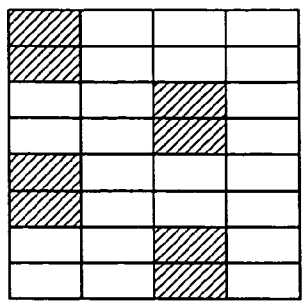
FIGS. 5A to 5F are views showing an example of a case in which screen processing of a second embodiment is implemented on a halftone dot meshed part.
Figure 5B:
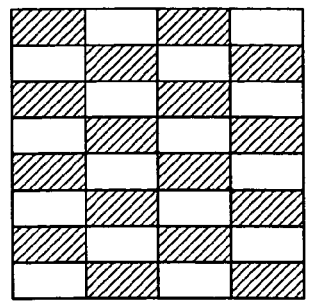
Figure 5C:
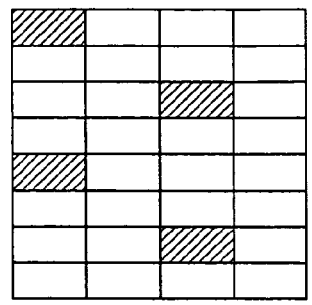
Figure 13A:
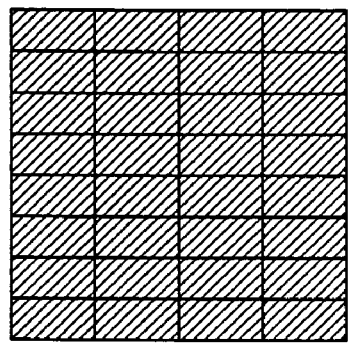
FIGS. 13A to 13D are views showing an example of a case in which conventional screen processing is implemented on a halftone dot meshed part.
Figure 13B:
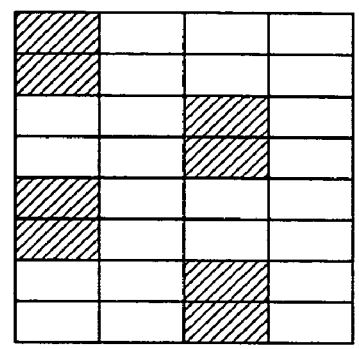
Figure 13C:
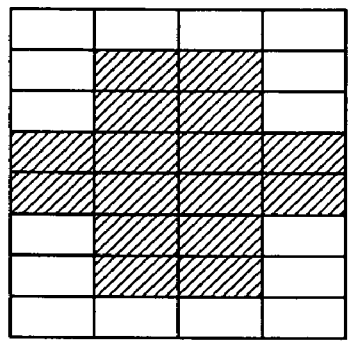
Figure 13D:
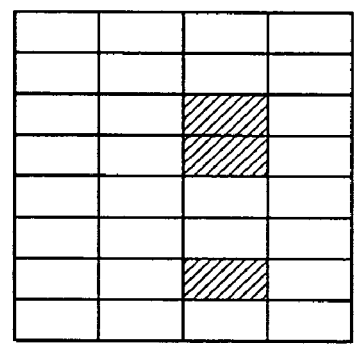

For example, when screen processing is implemented on raster data such as those shown in FIG. 5A (which have been subjected to 25% halftone dot meshing processing, similarly to FIG. 13B described above) using a 424 line, 45 degree screen pattern such as that shown in FIG. 5B, the processing result is as shown in FIG. 5C, where it can be seen that there is little change. Particularly when compared to the pattern in FIG. 5F, which is the processing result obtained when screen processing is implemented on raster data such as those shown in FIG. 5D (identical to the data shown in FIG. 5A) using a 190 line, 108 degree screen pattern such as that shown in FIG. 5E, it can be seen that there is little change in the pattern in FIG. 5C.

Figure 5D:
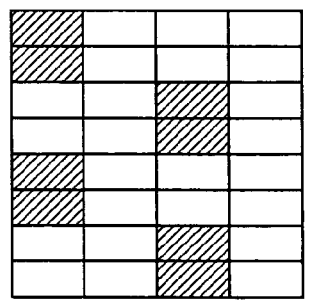
Figure 5E:
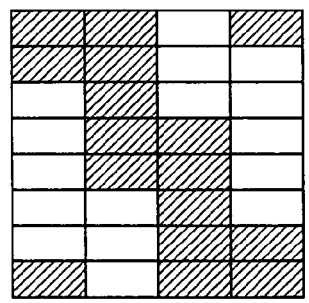
Figure 5F:
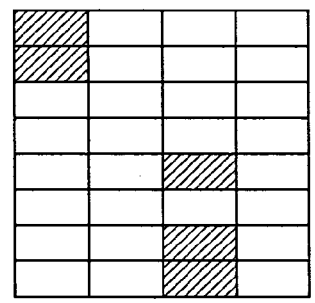

Note that in FIGS. 5A to 5F, the diagonally shaded parts are rendered parts, and the patterns in FIGS. 5C and 5F, which are the results of the screen processing, are the product of the patterns in FIGS. 5A and 5B (AND processing), and the product of the patterns in FIGS. 5D and 5E (AND processing) respectively.

Figure 6A:
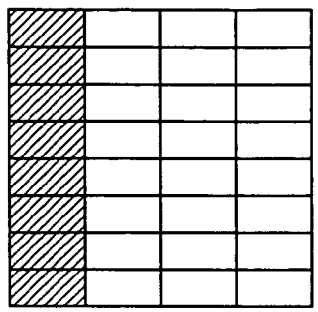
FIGS. 6A to 6F are views showing an example of a case in which the screen processing of the second embodiment is implemented on a thin line part.
Figure 6B:
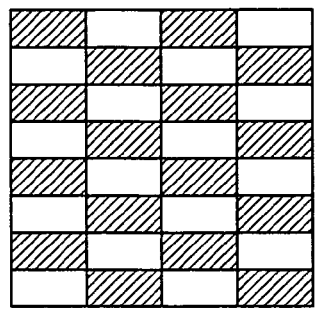
Figure 6C:
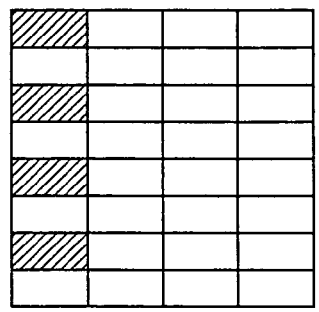
Figure 14A:
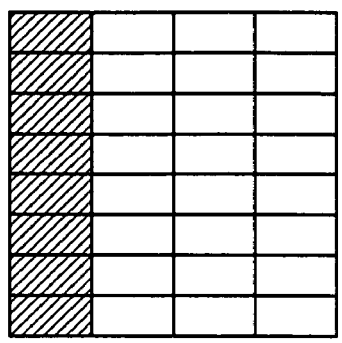
FIGS. 14A to 14C are views showing an example of a case in which conventional screen processing is implemented on a thin line part.
Figure 14B:
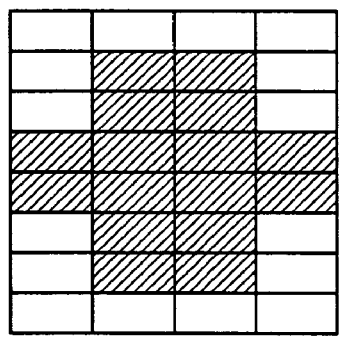
Figure 14C:
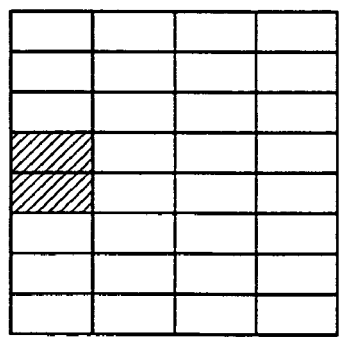

When screen processing is implemented on raster data such as those shown in FIG. 6A (similar to those in FIG. 14A described above) using a 424 line, 45 degree screen pattern such as that shown in FIG. 6B, the processing result is as shown in FIG. 6C, where it can be seen that there is little change. Particularly when compared to the pattern in FIG. 6F, which is the processing result obtained when screen processing is implemented on raster data such as those shown in FIG. 6D (identical to the data shown in FIG. 6A) using a 190 line, 108 degree screen pattern such as that shown in FIG. 6E, it can be seen that there is little change in the pattern in FIG. 6C.

Figure 6D:
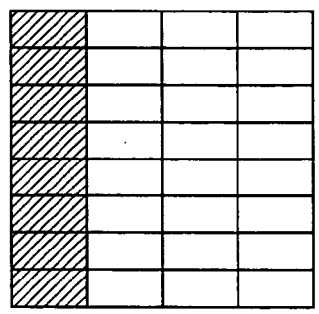
Figure 6E:
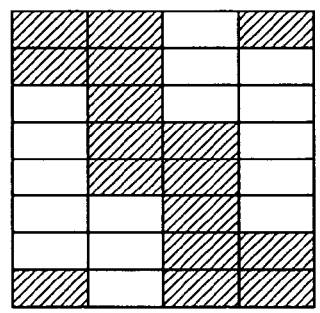
Figure 6F:
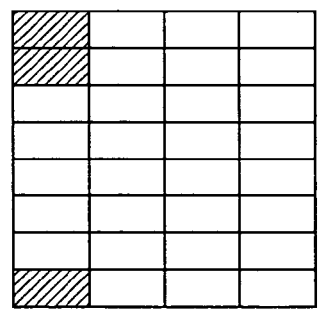

Note that in FIGS. 6A to 6F, the diagonally shaded parts are rendered parts, and the patterns in FIGS. 6C and 6F, which are the results of the screen processing, are the product of the patterns in FIGS. 6A and 6B (AND processing), and the product of the patterns in FIGS. 6D and 6E (AND processing) respectively.

Figure 7A:
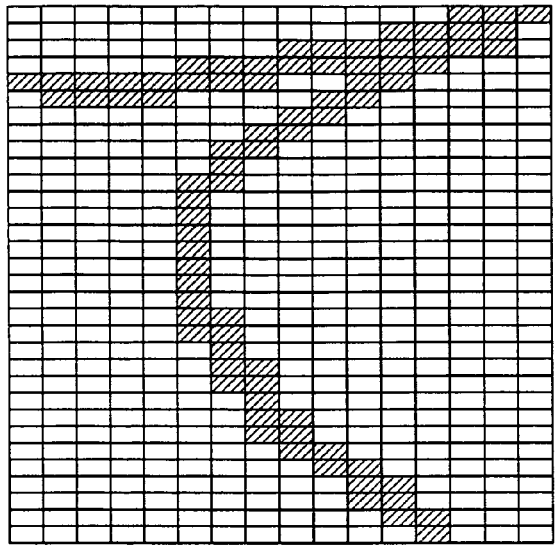
FIGS. 7A to 7C are views showing an example of a case in which the screen processing of the second embodiment is implemented on a character part.
Figure 7B:
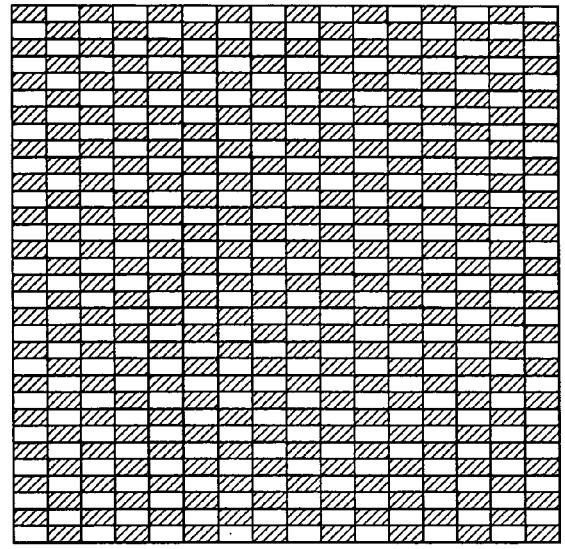
Figure 7C:
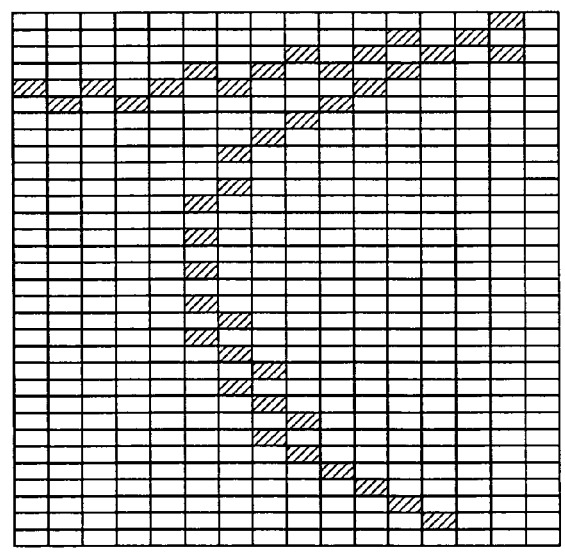
Figure 15A:
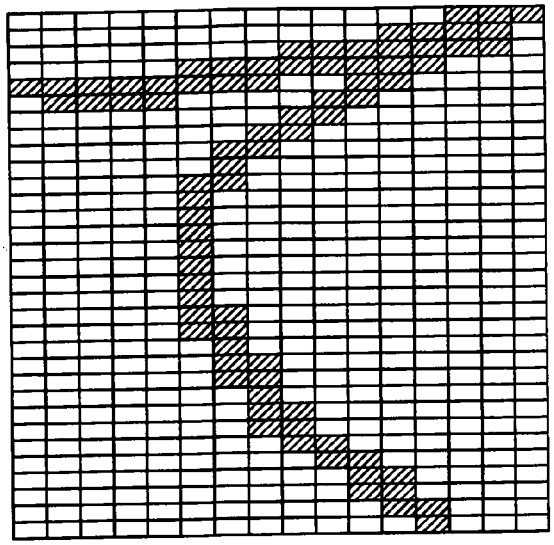
FIGS. 15A to 15C are views showing an example of a case in which conventional screen processing is implemented on a character part.
Figure 15B:
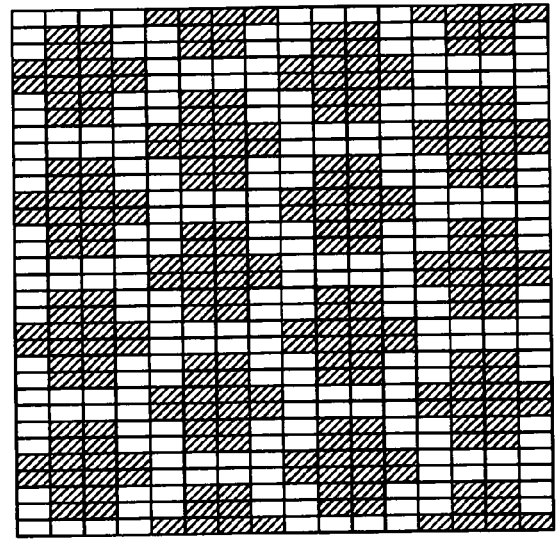
Figure 15C:
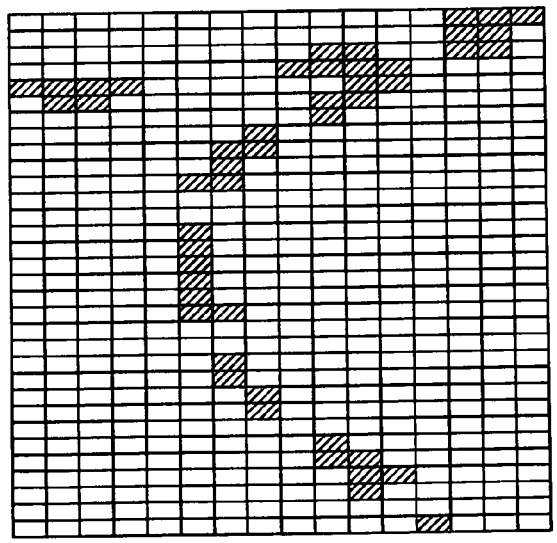

Further, when screen processing is implemented on raster data such as those shown in FIG. 7A (similar to those in FIG. 15A described above) using a 424 line, 45 degree screen pattern such as that shown in FIG. 7B, the processing result is as shown in FIG. 7C, where it can be seen that there is little change. Particularly when compared to the pattern in FIG. 8C, which is the processing result obtained when screen processing is implemented on raster data such as those shown in FIG. 8A (identical to the data shown in FIG. 7A) using a 190 line, 108 degree screen pattern such as that shown in FIG. 8B, it can be seen that there is little change in the pattern in FIG. 7C.

Note that in FIGS. 7A to 7C and 8A to 8C, the diagonally shaded parts are rendered parts, and the patterns in FIGS. 7C and 8C, which are the results of the screen processing, are the product of the patterns in FIGS. 7A and 7B (AND processing), and the product of the patterns in FIGS. 8A and 8B (AND processing) respectively.

By means of such processing, the raster data set with the "Pattern" tag do not interfere with the screen, and hence deterioration of the image quality can be reduced.

Third Embodiment

Of the processing to be described in the third embodiment, only the screen used in the screen processing section 24' differs from the processing of the second embodiment, and hence only the screen that is used will be described.

In the third embodiment, a screen pattern which is shifted from the screen pattern of a conventional screen is used for raster data determined to be set with the "Pattern" tag. As a result, each of colors is shifted.

Figure 9A:
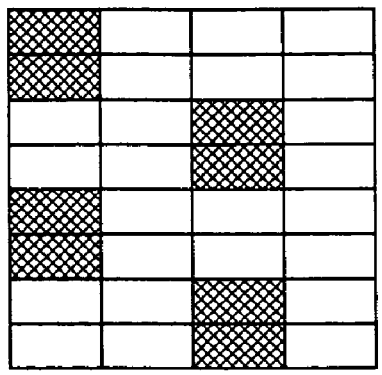
FIGS. 9A to 9D are views showing an example of a case in which screen processing of a third embodiment is implemented on a halftone dot meshed part.
Figure 9B:
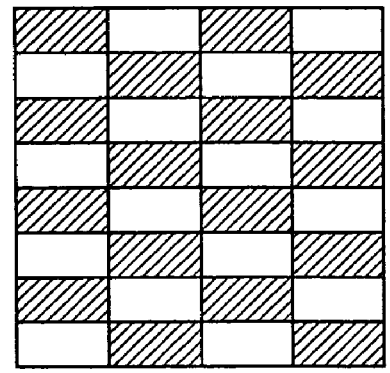
Figure 9C:
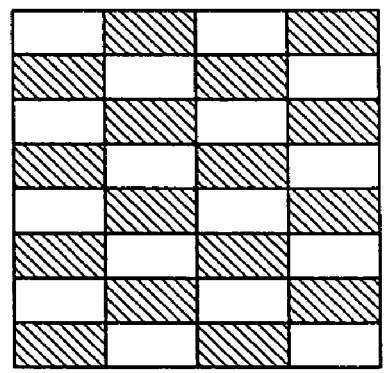
Figure 9D:
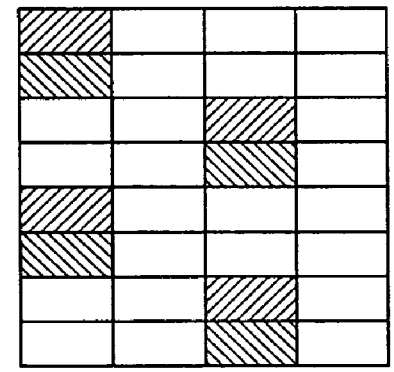

For example, when the original raster data are raster data such as those shown in FIG. 9A (which have been subjected to 25% halftone dot meshing processing and are green-type in color (R=128, G=255, B=128)), a cyan screen pattern such as that shown in FIG. 9B is used, and a yellow screen pattern such as that shown in FIG. 9C, which is a shifted version of the pattern shown in FIG. 9B, is used. The processing result is as shown in FIG. 9D, where it can be seen that there is little change.

Note that in FIGS. 9A to 9D, the parts shaded diagonally in both directions in FIG. 9A are rendered parts, the parts shaded diagonally from top right to bottom left in FIG. 9B are parts rendered in cyan, and the parts shaded diagonally from top left to bottom right in FIG. 9C are parts rendered in yellow. The pattern shown in FIG. 9D, which is the result of the screen processing, is the product of the patterns shown in FIGS. 9A, 9B, and 9C (AND processing).

Figure 10A:
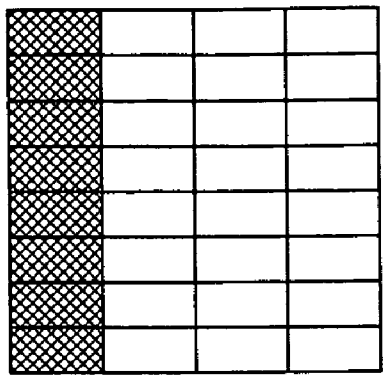
FIGS. 10A to 10D are views showing an example of a case in which the screen processing of the third embodiment is implemented on a thin line part.
Figure 10B:
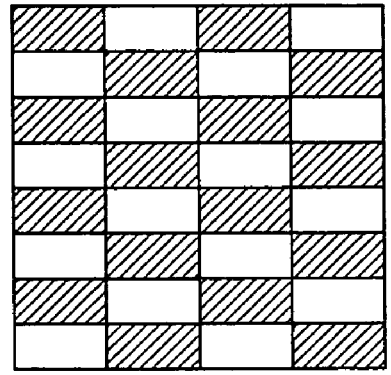
Figure 10C:
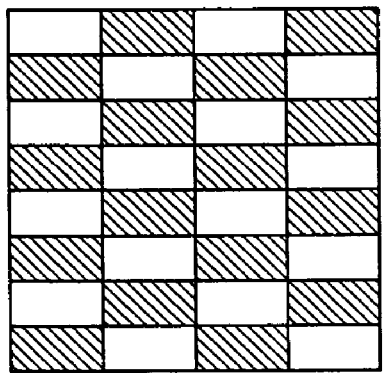
Figure 10D:
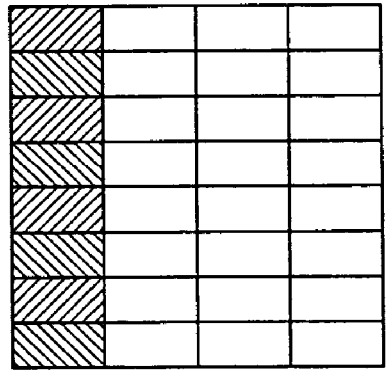

When the original raster data are thin line raster data such as those shown in FIG. 10A (which have been subjected to 25% halftone dot meshing processing and are green-type in color (R=128, G=255, B=128)), a cyan screen pattern such as that shown in FIG. 10B is used, and a yellow screen pattern such as that shown in FIG. 10C, which is a shifted version of the pattern shown in FIG. 10B, is used. The processing result is as shown in FIG. 10D, where it can be seen that there is little change.

Note that in FIGS. 10A to 10D, the parts shaded diagonally in both directions in FIG. 10A are rendered parts, the parts shaded diagonally from top right to bottom left in FIG. 10B are parts rendered in cyan, and the parts shaded diagonally from top left to bottom right in FIG. 10C are parts rendered in yellow. The pattern shown in FIG. 10D, which is the result of the screen processing, is the product of the patterns shown in FIGS. 10A, 10B, and 10C (AND processing).

Figure 11A:
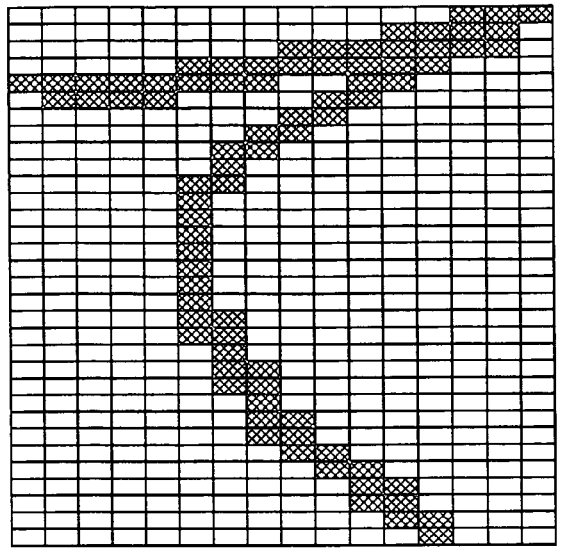
FIGS. 11A to 11D are views showing an example of a case in which the screen processing of the third embodiment is implemented on a character part.
Figure 11B:
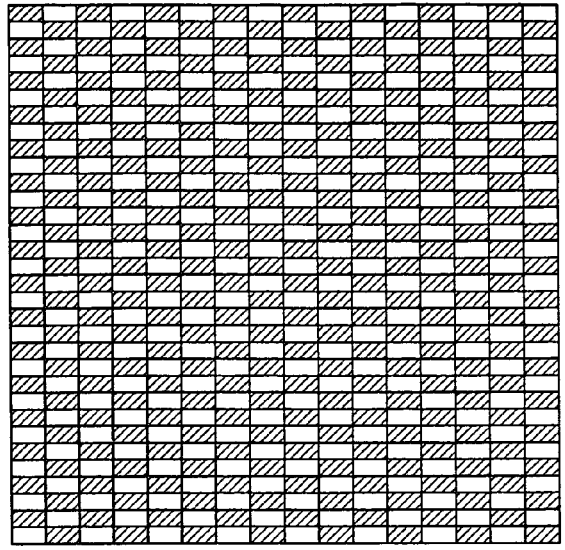
Figure 11C:
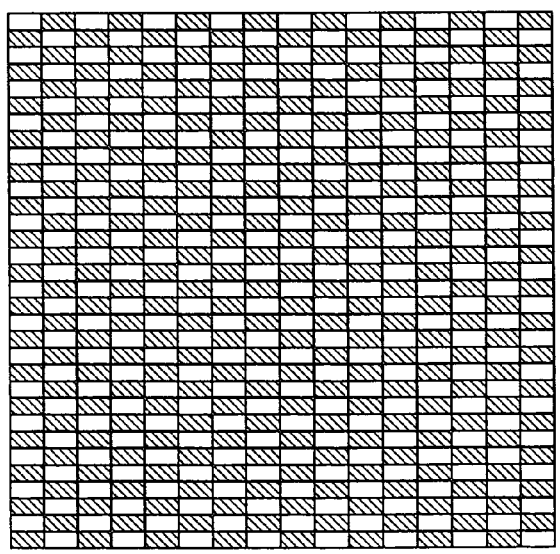
Figure 11D:
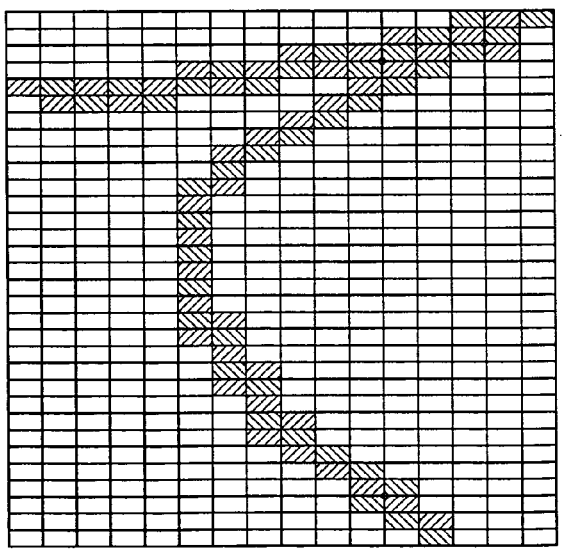

Further, when the original raster data are character raster data such as those shown in FIG. 11A (which have been subjected to 25% halftone dot meshing processing and are green-type in color (R=128, G=255, B=128)), a cyan screen pattern such as that shown in FIG. 11B is used, and a yellow screen pattern such as that shown in FIG. 11C, which is a shifted version of the pattern shown in FIG. 11B, is used. The processing result is as shown in FIG. 11D, where it can be seen that there is little change.

Note that in FIGS. 11A to 11D, the parts shaded diagonally in both directions in FIG. 11A are rendered parts, the parts shaded diagonally from top right to bottom left in FIG. 11B are parts rendered in cyan, and the parts shaded diagonally from top left to bottom right in FIG. 11C are parts rendered in yellow. The pattern shown in FIG. 11D, which is the result of the screen processing, is the product of the patterns shown in FIGS. 11A, 11B, and 11C (AND processing).

By means of this processing, the raster data set with the "Pattern" tag do not interfere with the screen, and hence deterioration of the image quality can be reduced.

Fourth Embodiment

Of the processing to be described in the fourth embodiment, only the processing performed in the image processing unit 20 differs from the processing of the first embodiment, and hence only the processing performed by an image processing unit 20" corresponding to the image processing unit 20 will be described.

Figure 12:
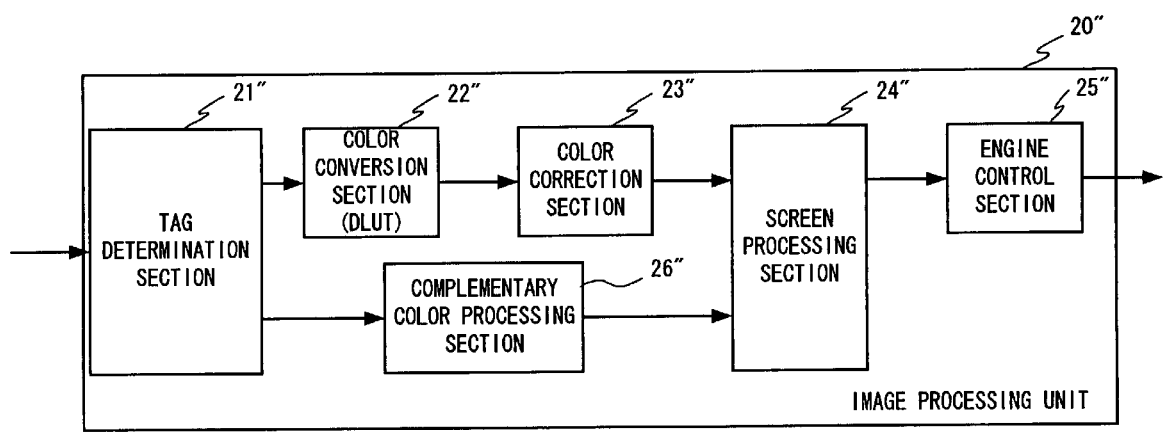
FIG. 12 is a block diagram showing the functional constitution of an image processing unit 20"

FIG. 12 is a block diagram showing the functional constitution of the image processing unit 20". As shown in the figure, the image processing unit 20" comprises a tag determination section 21", a color conversion section 22", a color correction section 23", a screen processing section 24", and an engine control section 25".

The tag determination section 21" identifies the "Image" tags, "Text/Graphics" tags, and "Pattern" tags set in the raster data input from the image data expansion unit 10, and subjects the raster data set with the "Pattern" tag to processing only by an auxiliary color processing section 26", without implementing the normal processing performed by the color conversion section 22" and color correction section 23".

The color conversion section 22" converts the data denoted by each of the R, G, B colors into data denoted by each of the Y, M, C, K colors using a DLUT. The color correction section 23" performs color correction processing and the like using a TRC. The screen processing section 24" performs screen processing. The engine control section 25" outputs the raster data denoted by each of the Y, M, C, K colors to the printer engine 30, and outputs signals for controlling the printer engine 30.

In the image processing unit 20", the raster data determined by the tag determination section 21" to be set with the "Image" tag or "Text/Graphics" tag are subjected to processing that is similar to conventional processing in the color conversion section 22", color correction section 23" screen processing section 24", and engine control section 25" successively, whereas the raster data determined by the tag determination section 21" to be set with the "Pattern" tag are subjected to processing in the auxiliary color processing section 26", screen processing section 24", and engine control section 25" successively.

Hence the raster data set with the "Pattern" tag are not subjected to color correction processing. During color correction processing, values are often rounded, causing the dot masses to become smaller. This is the reason why dots and their peripheries are emphasized in the technique in Japanese Patent Application Laid-Open No. 2001-45299, etc. However, if color correction processing is omitted, then the dots need not be emphasized. As a result, the raster data set with the "Pattern" tag do not interfere with the screen, and hence deterioration of the image quality can be reduced.

The entire disclosure of Japanese Patent Application No.2004-78652 filed on Mar. 18, 2004 including specification, claims, drawings and abstract is incorporated herein by reference in its entirety.

What is claimed is:

1. An image forming method for creating raster data based on image data written in a page description language, and forming an image based on the created raster data, wherein different image processing is implemented on first raster data created on the basis of a pattern fill command written in the page description language, and second raster data created on the basis of a command other than the pattern fill command, and upon the creation of the first raster data and the second raster data, different identification information is attached respectively to the first raster data and the second raster data, and the image processing is implemented on the basis of the identification information.

2. The image forming method according to claim 1, wherein only the first raster data is not subjected to screen processing.

3. The image forming method according to claim 1, wherein a screen ruling of a screen used in screen processing that is implemented on the first raster data is set to be higher than a screen ruling of a screen used in the screen processing that is implemented on the second raster data.

4. The image forming method according to claim 1, wherein a screen used in screen processing implemented on the first raster data has a pattern which is shifted from a predetermined pattern.

5. The image forming method according to claim 1, wherein only the first raster data is not subjected to color conversion processing and color correction processing.

6. An image forming method for creating raster data based on image data written in a page description language, and forming an image based on the created raster data, wherein different image processing is implemented respectively on first raster data created on the basis of a line drawing command, from among line drawing commands written in the page description language, in which a line width does not exceed a fixed value or a density does not exceed a fixed value, and on second raster data created on the basis of a command other than the line drawing command, and upon the creation of the first raster data and the second raster data, different identification information is attached respectively to the first raster data and the second raster data, and the image processing is implemented on the basis of the identification information.

7. The image forming method according to claim 6, wherein only the first raster data is not subjected to screen processing.

8. The image forming method according to claim 6, wherein a screen ruling of a screen used in screen processing that is implemented on the first raster data is set to be higher than a screen ruling of a screen used in the screen processing that is implemented on the screen raster data.

9. The image forming method according to claim 6, wherein a screen used in screen Processing implemented on the first raster data has a pattern which is shifted from a predetermined pattern.

10. The image forming method according to claim 6, wherein only the first raster data is not subjected to color conversion processing and color correction processing.

11. An image forming method for creating raster data based on image data written in a page description language, and forming an image based on the created raster data,
wherein different image processing is implemented respectively on first raster data created on the basis of a character drawing command, from among character drawing commands written in the page description language, in which a character size does not exceed a fixed value or a density does not exceed a fixed value, and on second raster data created on the basis of a command other than the character drawing command, and
upon the creation of the first raster data and the second raster data, different identification information is attached respectively to the first raster data and the second raster data, and the image processing is implemented on the basis of the identification information.

12. The image forming method according to claim 11, wherein only the first raster data is not subjected to screen processing.

13. The image forming method according to claim 11, wherein a screen ruling of a screen used in screen processing that is implemented on the first raster data is set to be higher than a screen ruling of a screen used in the screen processing that is implemented on the second raster data.

14. The image forming method according to claim 11, wherein a screen used in screen processing implemented on the first raster data has a pattern which is shifted from a predetermined pattern.

15. image forming method according to claim 11, wherein only the first raster data is not subjected to color conversion processing and color correction processing.

16. An image forming apparatus for creating raster data based on image data written in a page description language, and forming an image based on the created raster data, comprising:
an image processing switching unit which switches between image processing that is implemented on first raster data created on the basis of a pattern fill command written in the page description language, and image processing that is implemented on second raster data created on the basis of a command other than the pattern fill command; and
an identification information attaching unit which attaches different identification information respectively to the first raster data and the second raster data upon the creation of the first raster data and the second raster data,
wherein the image processing switching unit switches between the image processing that is implemented on the first raster data and the image processing that is implemented on the second raster data on the basis of the identification information attached by the identification information attaching unit.

17. The image forming apparatus according to claim 16, wherein the image processing switching unit does not implement screen processing on the first raster data alone.

18. The image forming apparatus according to claim 16, wherein the image processing switching unit sets a screen ruling of a screen used in screen processing that is implemented on the first raster data to be higher than a screen ruling of a screen used in the screen processing that is implemented on the second raster data.

19. The image forming apparatus according to claim 16, wherein the image processing switching unit implements screen processing on the first raster data with the use of a screen having a pattern which is shifted from a predetermined pattern.

20. The image forming apparatus according to claim 16, wherein the image processing switching unit does not implement color conversion processing and color correction processing on the first raster data alone.

21. An image forming apparatus for creating raster data based on image data written in a page description language, and forming an image based on the created raster data, comprising:
an image processing switching unit which switches between image processing that is implemented on first raster data created on the basis of a line drawing command, from among line drawing commands written in the page description language, in which a line width does not exceed a fixed value or a density does not exceed a fixed value, and image processing that is implemented on second raster data created on the basis of a command other than the line drawing command; and
an identification information attaching unit which attaches different identification information respectively to the first raster data and the second raster data upon the creation of the first raster data and the second raster data,
wherein the image processing switching unit switches between the image processing that is implemented on the first raster data and the image processing that is implemented on the second raster data on the basis of the identification information attached by the identification information attaching unit.

22. The image forming apparatus according to claim 21, wherein the image processing switching unit does not implement screen processing on the first raster data alone.

23. The image forming apparatus according to claim 21, wherein the image processing switching unit sets a screen ruling of a screen used in screen processing that is implemented on the first raster data to be higher than a screen ruling of a screen used in the screen processing that is implemented on the second raster data.

24. The image forming apparatus according to claim 21, wherein the image processing switching unit implements screen processing on the first raster data with the use of a screen having a pattern which is shifted from a predetermined pattern.

25. The image forming apparatus according to claim 21, wherein the image processing switching unit does not implement color conversion processing and color correction processing on the first raster data alone.

26. An image forming apparatus for creating raster data based on image data written in a page description language, and forming an image based on the created raster data, comprising:
an image processing switching unit which switches between image processing that is implemented on first raster data created on the basis of a character drawing command, from among character drawing commands written in the page description language, in which a character size does not exceed a fixed value or a density does not exceed a fixed value, and image processing that is implemented on second raster data created on the basis of a command other than the character drawing command; and an identification information attaching unit which attaches different identification information respectively to the first raster data and the second raster data upon the creation of the first raster data and the second raster data, wherein the image processing switching unit switches between the image processing that is implemented on the first raster data and the image processing that is implemented on the second raster data on the basis of the identification information attached by the identification information attaching unit.

27. The image forming apparatus according to claim 26, wherein the image processing switching unit does not implement screen processing on the first raster data alone.

28. The image forming apparatus according to claim 26, wherein the image processing switching unit sets a screen ruling of a screen used in screen processing that is implemented on the first raster data to be higher than a screen ruling of a screen used in the screen processing that is implemented on the second raster data.

29. The image forming apparatus according to claim 26, wherein the image processing switching unit implements screen processing on the first raster data with the use of a screen having a pattern which is shifted from a predetermined pattern.

30. The image forming apparatus according to claim 26, wherein the image processing switching unit does not implement color conversion processing and color correction processing on the first raster data alone.

* * * * *